US00RE46001E

(19) United States
(12) Reissued Patent
Habetha et al.

(10) Patent Number: US RE46,001 E
(45) Date of Reissued Patent: May 10, 2016

(54) METHOD OF CONNECTING A NEW DEVICE TO EXISTING NETWORK

(75) Inventors: Joerg Habetha, Aachen (DE); Markus Meng Hai Ang, Singapore (SG)

(73) Assignee: KONINKLIJKE PHILIPS N.V., Eindhoven (NL)

(21) Appl. No.: 13/438,884

(22) Filed: Apr. 4, 2012

Related U.S. Patent Documents

Reissue of:

(64) Patent No.: 7,826,420
Issued: Nov. 2, 2010
Appl. No.: 11/572,276
Filed: Jan. 18, 2007

(30) Foreign Application Priority Data

Jul. 22, 2004 (EP) ..... 04103493

(51) Int. Cl.
*H04W 84/20* (2009.01)
*G06F 15/16* (2006.01)
*H04W 88/18* (2009.01)

(52) U.S. Cl.
CPC ..... *H04W 88/18* (2013.01)

(58) Field of Classification Search
CPC ..... H04W 84/20; G06F 15/16
USPC ..... 370/328–330, 335, 337, 390, 338, 341, 370/348, 445, 449, 346; 455/500, 507, 455/41.2; 709/203, 209, 226–227, 228, 709/229, 238
See application file for complete search history.

(56) References Cited

U.S. PATENT DOCUMENTS 6,381,467 B1 4/2002 Hill et al.
6,925,064 B2 * 8/2005 Hester et al. ..... 370/255
7,826,420 B2 * 11/2010 Habetha et al. ..... 370/329
2001/0029166 A1 10/2001 Rune et al.
2003/0099212 A1 * 5/2003 Anjum et al. ..... 370/328
2005/0195757 A1 * 9/2005 Kidder et al. ..... 370/278

FOREIGN PATENT DOCUMENTS

CN 1408157 A 2/2003
EP 1503549 A2 2/2005
EP 1517490 A2 3/2005
WO 0141348 A2 6/2001
WO 03047176 A1 6/2003
WO 2005062809 A2 7/2005

OTHER PUBLICATIONS

Tan, G. "Interconnecting Bluetooth-Like Personal Area Networks", 1st Annual Oxygen Workshop, Gloucester, MA 2001.

(Continued)

*Primary Examiner* — Hanh N Nguyen

(57) ABSTRACT

In a centralized radio network consisting of several devices one device acts as master or network coordinator and has a transmission range. Basically, other devices of the network are able to adopt the role of a coordinator. This ability is used to enlarge the area of the network to a size larger than the transmission range of the master. A device asks its parent PNC to become a child PNC when a newly turned on device acts as a temporary PNC and broadcasts an initiation beacon indicating that it looks for a child PNC. The child PNC reports that it is available. The new device determines one of the available child PNCs to be its new master. The acknowledgment for the selected child PNC may be broadcasted to inform all the devices in the transmission range of the new device. The new device quits the role of the temporary PNC and associates to the existing network.

46 Claims, 5 Drawing Sheets

(56) References Cited

OTHER PUBLICATIONS

Tuduce et al, "Organizing a Distributed Application in a Mobile Ad Hoc Network", Proceedings of 2nd IEEE International Symposium on Network Computing and Applications, Apr. 2003, p. 231-238.

Kumar, N. "805.15.3 MAC Layer Overview and Proposed Enhancement for Support UWB PHY", Mobile and Portalbe Radio Research Group, Virginia Tech, 2004.

Trezentos et al, "Algorithms for Ad-Hoc PICONET Topology Initialization", Vehicular Technology Conference, 2003, VTC 2003, IEEE, vol. 5, Oct. 6, 2003, p. 3448-3452.

* cited by examiner

METHOD OF CONNECTING A NEW DEVICE TO EXISTING NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The invention relates to a method of connecting a new device to an existing network. The network or piconet comprises a coordinator which controls a certain part, e.g. a cell or a cluster, of the network. Such networks are often referred to as cluster-based or piconet-based networks. For example, the Bluetooth standard is used for piconet-based networks. The central controllers of the clusters are therefore called Cluster Heads or PicoNet Coordinators (PNCs). The inventive method is based on a procedure of how a device that is out of the transmission range of an existing PNC can be informed about the existing PNC and how the device then can be connected to the existing piconet thereby avoiding interference between neighbouring, uncoordinated piconets.

The invention especially relates to wireless personal area networks (WPAN) according to the protocol IEEE P802.15.3. This protocol is based on a centralised and connection-oriented ad-hoc networking topology. At initialisation of a new network, one device or node will be required to assume the role of the coordinator of the WPAN, i.e. it will become the piconet coordinator/scheduler (PNC). The PNC may

- provide the basic network synchronisation timing,
- perform admission control,
- allocate network resources on the piconet according to a pre-defined set of quality of service (QoS) polices,
- allocate the amount of channel time (CT) resources available for data transfer and
- manage Power Safe requests.

A device that is trying to access the medium tries to detect a coordinator to associate to. If it does not detect a coordinator within a determined period of time it becomes itself a piconet coordinator. A device participating in one piconet sometimes looks for other piconets with a better signal or a lower network load. Every device of a piconet can hear the PNC and the slot assignments.

Overlapping cells that share the same channel frequency can build a child/neighbour piconet that timeshares a channel between two PNCs (parent and child/neighbour) sitting on the same frequency and being within range.

The IEEE802.15.3 protocol may be used for a peer-to-peer communication in a Wireless Personal Area Network (WPAN). The current medium access control (MAC) specification is based on a centralised approach. Access to the wireless medium is granted by a central device called the piconet coordinator (PNC). The PNC and all devices under its control form a piconet. It is possible that several piconets are formed in case not all devices are located in mutual transmission and reception range. One topology defined in IEEE 802.15.3 for multiple piconet scenarios consists of a hierarchy of PNCs. Per definition one PNC is the highest PNC in the hierarchy. This PNC can have one or several child-PNCs (CPNCs) which themselves can have several child-PNCs and so on. When a device is turned on, it begins to scan all the available channels for an existing PNC. While scanning, information about the channels in use is also collected and stored. The devices use passive scanning, that is listening for beacon frames from PNC. This can be a good indication of whether or not there is a piconet in the vicinity. If during the scanning process a broadcast signal like a beacon has not been detected, the device assumes that there is not any PNC in its vicinity to which it could associate. The device will then adopt the role of a PNC by internally issuing a PNC start primitive.

Nishant Kumar, "802.15.3 MAC layer Overview and Proposed Enhancements to Support UWB PHY", Mobile and Portable Radio Research Group, Virginia Tech. discloses the feature child piconet. An alternate coordinator requests GTS (guaranteed time slots) using channel request time command. After receiving a GTS slot the child PNC starts sending beacon in the private GTS. A child piconet uses a distinct piconet ID (identification). The child piconet depends on the parent piconet only for the allocation of a GTS. Association, authentication, security and acknowledgements are handled within the child piconet and do not involve the parent PNC. A child PNC device can communicate with any member in the parent piconet or the child piconet. Whereas a neighbour piconet is autonomous and relies on the parent piconet only for the GTS. It uses a distinct piconet ID. Association, authentication, security and acknowledgements are handled within a neighbour piconet and do not involve the parent PNC. A neighbour PNC device can only send channel time requests to parent PNC and listen to its beacon.

A super frame consists of three subsections like beacon, CAP (contention access period), CFP (Contention Free Period). The beacon transmits control information, allocated GTS per stream index for the current super frame and provides network wide timing information. The CAP uses CSMA/CA (Carrier Sense Medium Access with Collision Avoidance) with back-off procedure. It is used for seamless data transfer, channel time requests, authentication, association request, response and other commands in the system. The CRP (contention free period) comprises optional management time slots (MTS) and guaranteed time slots (GTS) that are used for asynchronous or isochronous data streams. The PNC controls in the CAP beacon the type of data to be sent during the CAP.

U.S. Pat. No. 6,381,467 B1 discloses an ad-hoc wireless network having a plurality of members with a master that while communicating on a first communication channel recognises a need for assistance in managing the network. In response to the need, the master negotiates with a member of the ad-hoc wireless network for the member to become a sub-master. The sub-master then assumes management of a portion of the plurality of members. The sub-master and the portion then communicate on a second communication channel negotiated with the master. The processor is programmed to recognise the need for assistance in response to detecting a need to establish communications between a first communication device in the ad-hoc wireless network and a second communication device within range of the first communication device but not within range of the master. In this case, the master can negotiate this first communication device for the first communication device to become a sub-master and then to establish its own ad-hoc wireless network with the second communication device on a communication channel different from the communication channel used by the master.

Godfrey Tan, "Interconnecting Bluetooth-like Personal Area Networks", in 1$^{st}$ Annual Oxygen Workshop, Gloucester, Mass., 2001, discloses an algorithm for a personal area network that contracts a tree incrementally, one node at a time. When a node wishes to join the network, it sends out frequent search announcements. Nodes that already belong to the scatternet of multiple piconets periodically listen on a pre-defined channel for these announcements and respond if they are willing to accept a new neighbour. When there is more than one node responding to the new node, a decision has to be made on which present node a new device should join. This decision can be made by the new node based on the responses it hears or by the root. The root can gather the information from all the child nodes which hear the search messages and choose which one to respond to the searching node. When a new node connects to a node in the scatternet, the latter becomes a "parent" and the former its "child".

One object of the invention is to provide a method of connecting to an existing centralized radio network (piconet) which comprises a master device such as a network coordinator and at least one further device in the transmission range of the network coordinator (PNC) a further device not being in the transmission range of the network coordinator. A further object is to provide a network to which a new device that is out of the transmission range of the network coordinator may associate to.

The object is solved by a method of connecting to an existing centralized radio network (piconet) which comprises a master device such as a network coordinator and at least one further device in the transmission range of the network coordinator a at least one new device not being in the transmission range of the network coordinator, with the method comprising the steps of the new device becoming a temporary network coordinator which broadcasts a beacon with an initiation request (such as a PNC request IE) indicating that it intends to associate to an existing network (piconet);

those devices that became a child network coordinator signalling a response to the initiation beacon in form of one or several broadcast or unicast frames indicating that they are available child piconet coordinators;

the new device that acts as a temporary network coordinator scanning the channels or frequencies, receiving the response signals and choosing at least one of the available child network coordinators as master;

acknowledging at least the selected child network coordinators' response signals and finishing the role of a temporary network coordinator and becoming a slave with regard to the chosen child network coordinator which works as a coordinator.

When the new device becomes a temporary PNC it is able to broadcast signals such as beacons that are read by any device in the transmission range. Devices which are receiving the initiation beacon are informed of the new device's intention to associate to a network and at the same time of the fact that it would not make sense to do a handover even if the signal level is higher than the one of its own PNC as the new device will not stay a PNC.

The step of becoming a child network coordinator is alternatively performed by a device that has received the beacon with the initiation request asking its network coordinator (master) whether to become a child network coordinator of the parent network coordinator in order to become a master for the new device or making itself a child network coordinator without asking the parent network coordinator.

The initiation beacon may comprise an information element indicating a temporary network/piconet identification. This temporary identification indicates that other devices neither should associate to the temporary PNC nor do a handover.

The temporary network coordinator may wait for a response a certain period of time corresponding to a given number of beacon frames. During that time the exchange between the network's coordinator and the probable child PNC should be carried out. When that certain period of time is over and scanning the channels/frequencies did not result in discovering a child PNC, the new device itself becomes a new PNC and starts an own piconet as there is not a piconet in the vicinity to associate to.

According to one embodiment the acknowledgement of a selected child network coordinator is transmitted as part of a beacon signal such that other child PNCs which were available can be returned to their former state immediately.

The object is also solved by a centralized radio network (piconet) consisting of at least two devices wherein one of the at least two devices is a network coordinator having a transmission range for its beacons and wherein at least one further device is in the transmission range of the network coordinator and wherein a new device scans the channels or frequencies for discovering a network coordinator's beacon of an existing network in order to associate to it, wherein the new device becomes a temporary network coordinator if it did not receive a beacon signalled by a network coordinator within a certain time and sends out an initiation beacon indicating that it intends to associate to an existing network (piconet);

a device belonging to an existing network (piconet) that receives the initiation beacon signal of the temporary network coordinator asks its own network coordinator whether to become a child network coordinator and in case of positive answer: transmitting a corresponding response signal indicating that it is an available child piconet coordinator to associate to;

the temporary network coordinator receives the response signals, compares them and determines at least one of the available devices which will become the child network coordinator (CPNC) it associates itself to;

the temporary network coordinator (tempPNC) acknowledges the availability signals of the selected CPNC(s) and changes its state into being a slave with regard to the selected child network coordinator(s) (CPNC(s)) and the new device thus is connected to the existing network (piconet).

A computer program that is run down by a processor and comprises instructions for the implementation of a method of connecting to an existing network a new device.

A device of consumer electronics comprising a processor for running down a computer program that comprises instructions for the implementation of a method of connecting to an existing network a new device that is out of the transmission range of the network coordinator and comprising means for the implementation of such a method.

The invention may be summarized by a centralised radio network consisting of several devices wherein one device acts as master or network coordinator and has a transmission range. Basically, other devices of the network are able to adopt the role of a coordinator. This ability is used to enlarge the area of the network to a size larger than the transmission range of the master. A device asks its parent PNC to become a child PNC when a newly turned on device acts as a temporary PNC and broadcasts an initiation beacon indicating that it looks for a child PNC. The child PNC reports that it is available. The new device determines one of the available child PNCs to be its new master. The acknowledgment for the selected child PNC may be broadcasted to inform all the devices in the transmission range of the new device. The new device quits the role of the temporary PNC and associates to the existing network.

In the following, the invention will be described in further detail with reference to the accompanying drawing, wherein FIG. 1 illustrates a situation according to the prior art with a device outside the beacon transmission (Tx) range of a PNC-1 of a first piconet;

Figure 1:
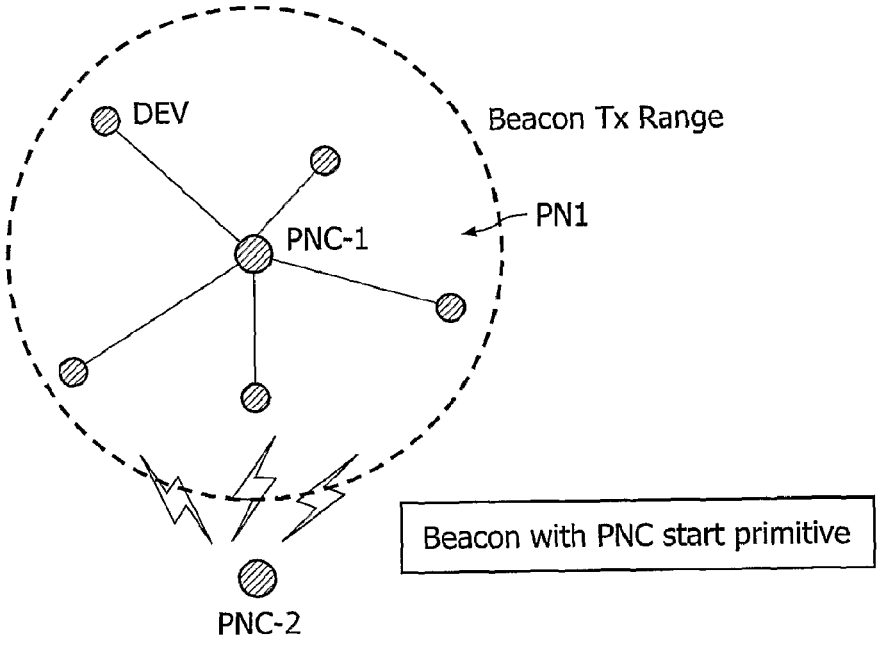
FIG. 1 prior art

FIG. 1 illustrates a situation according to the prior art with a device outside the beacon transmission (Tx) range of a PNC-1 of a first piconet and thus not being able to associate to the first piconet. Thus, the new device itself has to become a PNC-2 and starts a second piconet. Two piconets close to one another may result in interference. For example, a device in the intersection of the transmission ranges of both PNCs may switch over to the other piconet if the beacon signal of that PNC is of higher strength. One solution to cope with the interference would be to open the second piconet on a different channel. However, there are systems like 802.15.3a, in which the channels are not fully orthogonal resulting in interference among the two piconets, even if they operate on two different channels.

Figure 2:
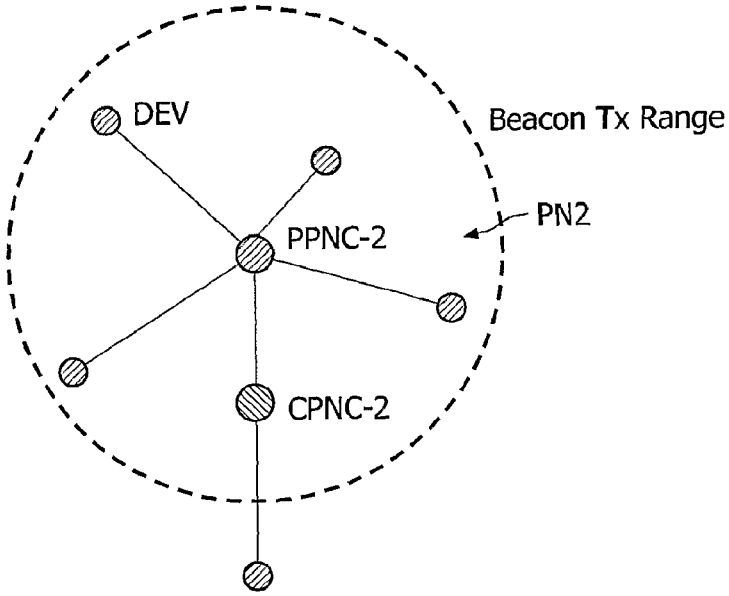
FIG. 2 illustrates one alternative of the invention with a topology resulting in a single piconet where a new device is located outside the beacon Tx range of the Parent PNC.

FIG. 2 illustrates one alternative of the invention with a topology resulting in a single piconet where a new device DEV new, i.e. a device that has just been turned on, is located outside the beacon Tx range of the Parent PNC (PPNC), but within the hearing range of the Child PNC (CPNC). The new device associates itself to the CPNC which becomes its master. By setting up a CPNC which becomes a master for a new device it is avoided that the new device outside the Tx range of a PNC itself becomes a PNC and starts a piconet on its own.

Figure 3:
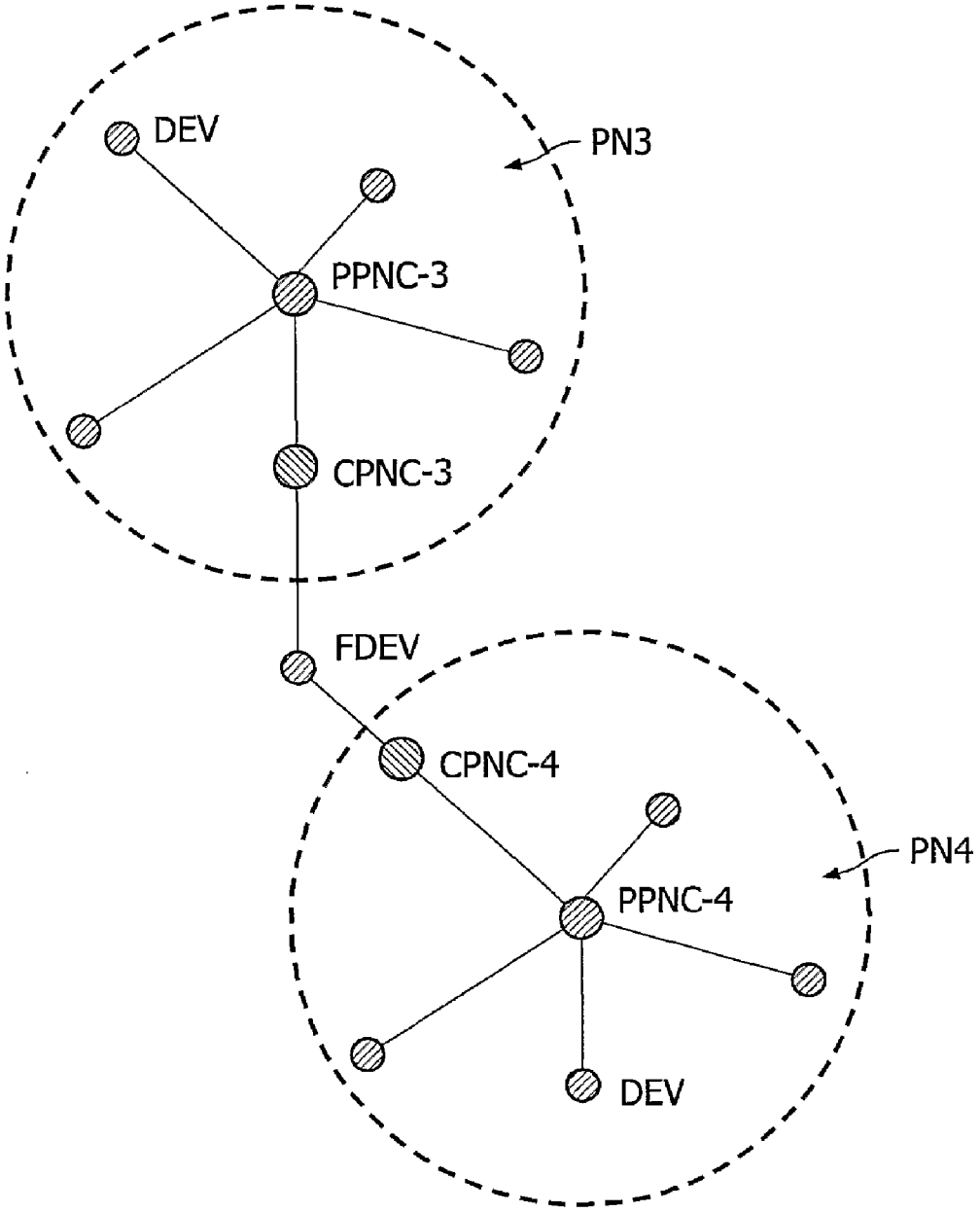
FIG. 3 illustrates another alternative of the invention with a topology where a device that has been turned on intends to associate a piconet and becomes a forwarding device.

FIG. 3 illustrates another alternative of the invention with a topology where a device that has been turned on intends to associate to a piconet and becomes a forwarding device FDEV with two masters: the first master is a CPNC-1 of a first piconet and the second master is a CPNC-2 of a second piconet. In this example the former topology before the association of the new device is kept and the new device becomes a FDEV. By this process two completely isolated piconets are connected while keeping the current topology.

Figure 4:
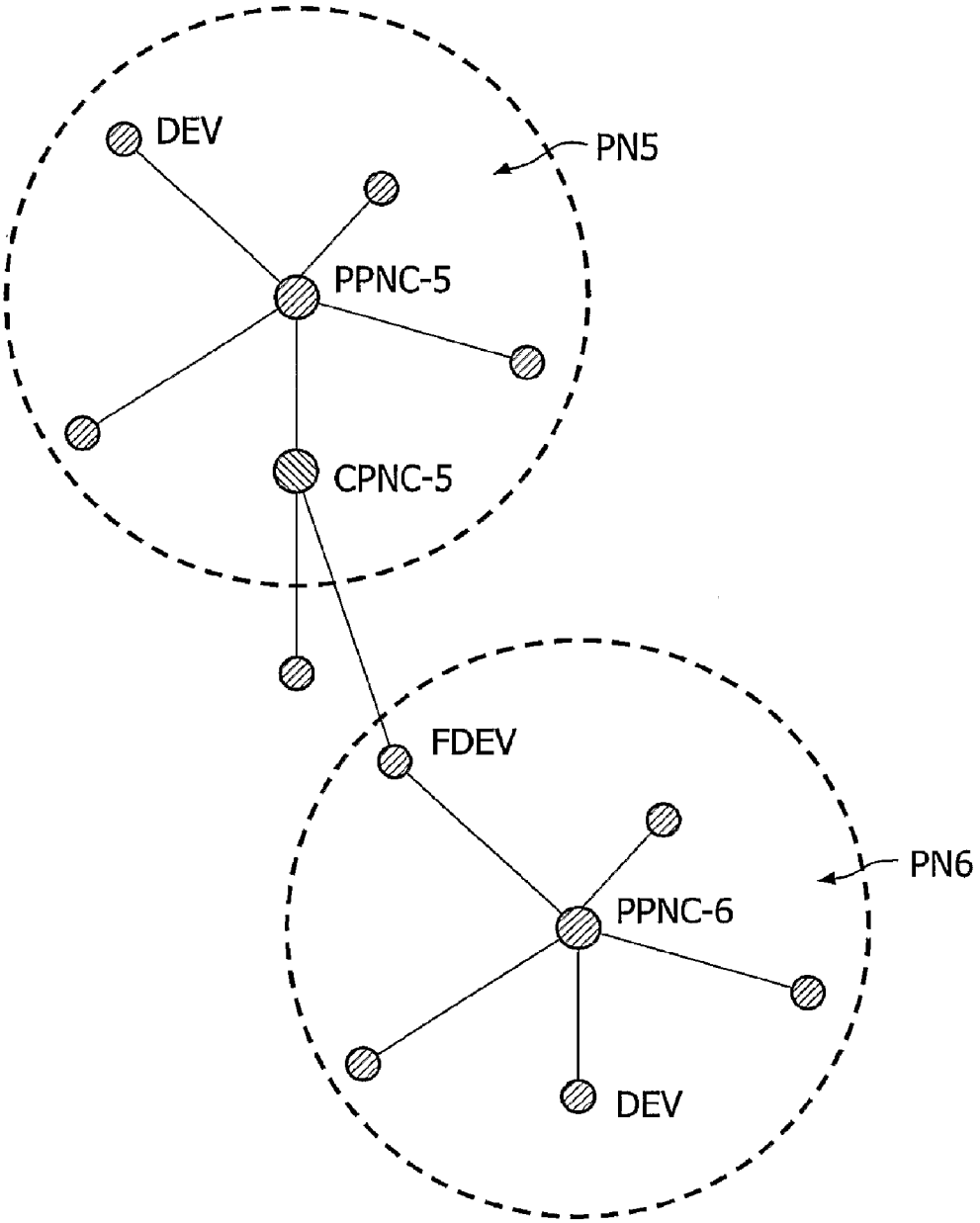
FIG. 4 illustrates a further alternative of the invention where a change in the topology occurs resulting in two piconets with two PPNCs and with only one CPNC and FIG. 5 illustrates a situation where several CPNCs are available.

FIG. 4 illustrates a further alternative of the invention. The arrangement of the devices is the same as the one of FIG. 3. But, according to the alternative a change in the topology occurs resulting in two piconets PN-5 and PN-6 with two PPNCs (PPNC-5 and PPNC-6) and with only one CPNC-5 compared to FIG. 3 where the two piconets PN-3 and PN-4 comprise two PPNCs (PPNC-3 and PPNC-4) and two CPNCs (CPNC-3 and CPNC-4). The topology is changed after the association of the new device to the two piconets. In this example, when the new device associates to the first piconet one device of the first piconet becomes a CPNC-5 for the new device as well as for the former CPN-6 (s. FIG. 3) of the second piconet PN-6, the former CPN-6 becomes a FDEV associated to two masters, namely CPNC-5 and CPNC-6. By means of the newly formed CPNC-5 the two formerly completely isolated piconets are connected with a change of the topology.

Figure 5:
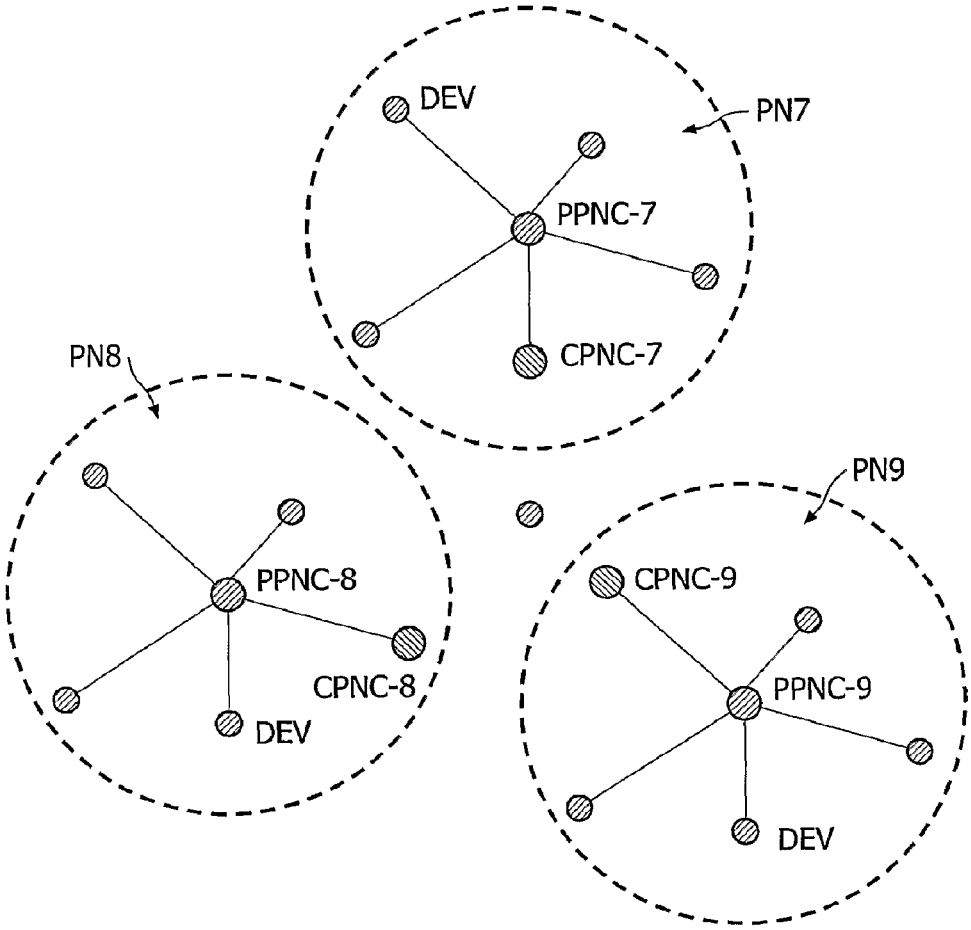

FIG. 5 illustrates a situation where several CPNCs are available. In this example three piconets PN-7, PN-8, PN-9 exist, each of them with a certain transmission Tx range around the PPNC-7, PPNC-8, PPNC-9. A further device is turned on outside the transmission range of each of the PPNCs. The new device is located in such a way that in its transmission range one device of each of the three piconets PN-7, PN-8, PN-9 exists. This means that three devices may be available as CPNC if their PPNC allows it. In this case, the new device which acts as a temporary PPNC when turned on, determines at least one of the available CPNCs as its master. In most cases the new device will select exactly one CPNC; however it might also be possible that the device wants to connect to several piconets or to act as a forwarding device FDEV between the piconets, in which case it would select several CPNCs. These devices will then be acknowledged as CPNC(s). After having determined at least one of the available CPNCs as master the new device which temporarily acted as a PPNC returns to the behaviour of a slave. The other available CPNCs which where not selected return to the state in which they previously were.

Figure 6:
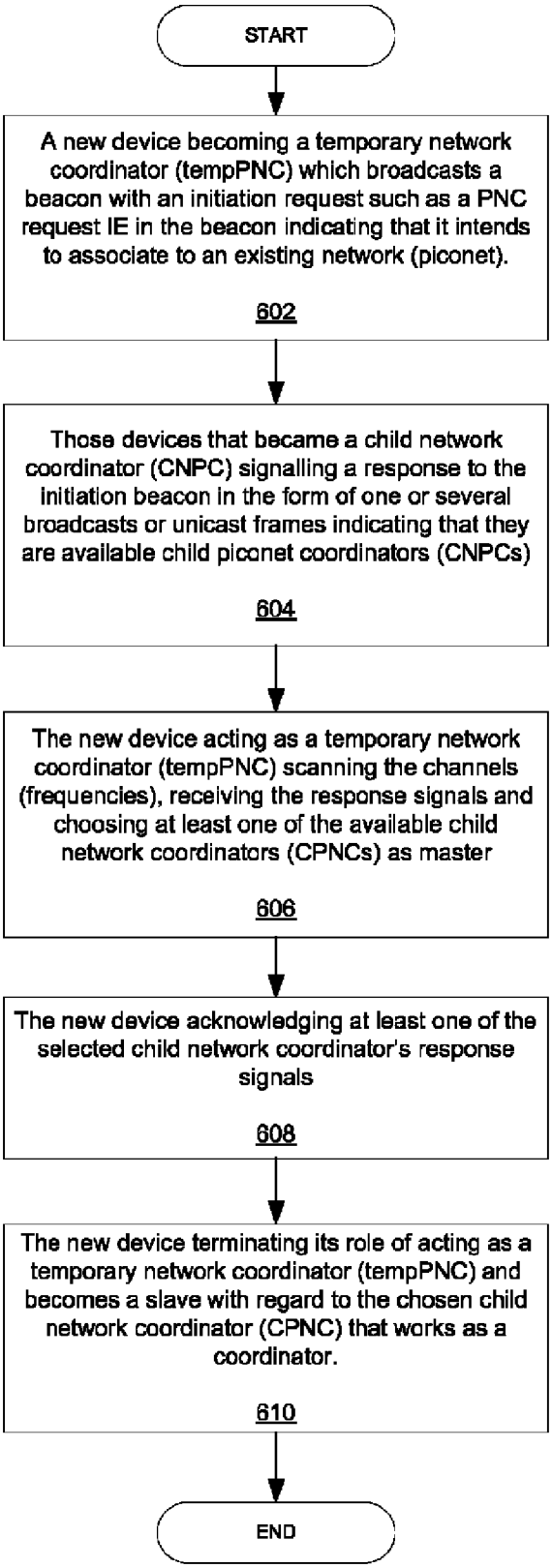
FIG. 6 is a flowchart illustrating steps of a method for connecting a device to an existing centralized radio network (piconet).

FIG. 6 is a flowchart illustrating steps of a method for connecting a device to an existing centralized radio network (piconet).

At step 602, a new device to be added to the network becomes a temporary network coordinator (tempPNC) which broadcasts a beacon with an initiation request such as a PNC request IE in the beacon indicating that it intends to associate to an existing network (piconet).

At step 604, those devices that became a child network coordinator (CNPC) signalling a response to the initiation beacon in the form of one or several broadcasts or unicast frames indicating that they are available child piconet coordinators (CNPCs)

At step 606, the new device to be added to the network acts as a temporary network coordinator (tempPNC) scanning the channels (frequencies), receiving the response signals and choosing at least one of the available child network coordinators (CPNCs) as master At step 608, the new device to be added to the network acknowledges at least one of the selected child network coordinator's response signals.

At step 610, the new device to be added to the network terminates its role of acting as a temporary network coordinator (tempPNC) and becomes a slave with regard to the chosen child network coordinator (CPNC) that works as a coordinator.

The invention claimed is:

1. A method of connecting a new device to be added to an existing centralized radio network (piconet) the network comprising a master device and at least one further device in the transmission range (Tx) of the network coordinator (PNC) at least one new device not being in the transmission range (Tx) of the network coordinator (PNC), the method comprising the steps of:

a) the new device to be added to the network, not being in the transmission range (Tx) of the network coordinator (PNC), becoming a temporary network coordinator (tempPNC) which broadcasts a beacon with an initiation request in the beacon indicating that it intends to associate to an existing network (piconet);

b) a device belonging to an existing network (piconet) that receives the beacon with the initiation request of the temporary network coordinator (tempPNC) optionally asks its own network coordinator (PNC) whether to become a child network coordinator (CPNC) and in case of positive answer or in case the optional request at the own PNC is not needed: transmitting a corresponding response signal indicating that it is an available child piconet coordinator (CPNC) to associate to;

c) those devices that became a child network coordinator (CPNC) signalling a response to the initiation beacon in form of one or several broadcast or unicast frames indicating that they are available child piconet coordinators (CPNCs);

d) the new device to be added to the network acting as a temporary network coordinator (tempPNC) scanning the channels or frequencies, receiving the response signals and choosing at least one of the available child network coordinators (CPNCs) as master;

e) the new device to be added to the network acknowledging at least one of the selected child network coordinators' response signals and f) the new device to be added to the network terminating its role of acting as a temporary network coordinator (tempPNC) and becoming a slave with regard to the chosen child network coordinator (CPNC) that works as a coordinator.

[2. A method as claimed in claim 1, wherein the step of becoming a child network coordinator (CPNC) is alternatively performed by a device that has received the beacon with the initiation request, the device receiving the beacon with the initiation request:

a) the new device to be added asking its network coordinator (master) whether to become a child network coordinator (CPNC) of the parent network coordinator (PPNC) in order to become a master for the new device and the PPNC giving a response to this request or otherwise, b) the new device to be added making itself a child network coordinator (CPNC) without asking the parent network coordinator (PPNC).]

3. A method as claimed in claim 1, wherein the initiation beacon comprises an information element indicating a temporary network/piconet identification (tempPNID).

4. A method as claimed in claim 1, wherein the temporary network coordinator (tempPNC) waits for a response a certain period of time corresponding to a given number of beacon frames.

5. A method as claimed in claim 1, wherein the acknowledgement of a selected child network coordinator (CPNC) is transmitted as part of a beacon signal.

6. A centralized radio network (piconet) consisting of at least two devices wherein one of the at least two devices is a network coordinator (PNC) having a transmission range (Tx) for its beacons and wherein at least one further device is in the transmission range (Tx) of the network coordinator (PNC) and wherein:

a new device desiring to connect to an existing centralized radio network scans channels or frequencies for discovering a network coordinator's beacon of an existing network in order to associate to it, wherein the new device becomes a temporary network coordinator (tempPNC) if it did not receive a beacon signalled by a network coordinator's (PNC) beacon within a certain time and sends out an initiation beacon indicating that it intends to associate to an existing network (piconet);

a device belonging to an existing network (piconet) that receives the initiation beacon signal of the temporary network coordinator (tempPNC) optionally asks its own network coordinator (PNC) whether to become a child network coordinator (CPNC) and in case of positive answer or in case the optional request at the own PNC is not needed: transmitting a corresponding response signal indicating that it is an available child piconet coordinator (CPNC) to associate to;

the temporary network coordinator (tempPNC) receives the response signals, compares them and determines at least one of the available devices which will become the child network coordinator (CPNC) it associates itself to;

the temporary network coordinator (tempPNC) acknowledges at least one of the availability signals and changes its state into being a slave with regard to the selected child network coordinator(s) (CPNCs) and the new device thus is connected to the existing network (piconet).

7. A method according to claim 1, wherein the master device is a network coordinator (PNC).

8. A method according to claim 1, wherein the initiation request included in the broadcast beacon is a PNC request.

9. A device to be connected to an existing centralized radio network (piconet), the network comprising a master device, at least one further device in the transmission range (Tx) of the network coordinator (PNC) and said device to be connected to the existing centralized radio network (piconet), wherein said device to be connected is not in the transmission range (Tx) of the master device, the device to be connected to the existing network including at least a processor configured for:

a) enabling the device to become a temporary network coordinator (tempPNC) by broadcasting a beacon with an initiation request, indicating that the device to be connected intends to associate to an existing network (piconet);

b) enabling the device to scan channels (frequencies) as temporary network coordinator (tempPNC) to receive response signals to the initiation beacon from those devices that became a child network coordinator (CNPC), the response signals indicating that the devices that became child network coordinators (CNPCs) are available as child piconet coordinators (CPNCs);

c) enabling the device to choose at least one of the available child network coordinators (CPNCs) as master by acknowledging a corresponding response signal of the at least one of the available child network coordinator (CPNC); and d) enabling the device to cease acting in the capacity of temporary network coordinator (tempPNC) and instead become a slave to the chosen child network coordinator (CPNC).

10. A device according to claim 9, wherein the response signals received from those devices that became a child network coordinator (CNPC) at said scanning step are in the form of one or several broadcasts or unicast frames indicating that the responding at least one further device is available as a child piconet coordinator (CPNC).

11. A device according to claim 9, wherein the master device is a network coordinator (PNC).

12. A device according to claim 9, wherein the initiation request included in the broadcast beacon is a PNC request.

*13. A method of connecting to add a new radio device to an existing centralized radio network (piconet) which existing network comprises:*

*at least one master device having a transmission range (Tx) for its beacons and including a network coordinator (PNC); and*

*at least one further device within the transmission range (Tx) of the network coordinator (PNC) with which it is*

*associated, the at least one further device being a slave of the network coordinator (PNC); the method comprising the acts of:*

*the new radio device becoming a temporary network coordinator (tempPNC);*

*broadcasting a beacon as temporary network coordinator (tempPNC), the beacon having an initiation request in the beacon indicating that it requests to associate with the existing centralized radio network (piconet);*

*the at least one further device of the existing centralized radio network (piconet) that receives the initiation beacon signal of the temporary network coordinator (tempPNC), when asking is needed, asks its associated network coordinator (PNC) whether the at least one further device is available to become a new child network coordinator (CPNC) device to be associated with the new radio device, when associated the new radio device becoming a slave of at least one child network coordinator (CPNC) master, and in case of receiving a positive answer from the associated network coordinator (PNC) or otherwise in the case that asking its associated network coordinator (PNC) is not needed: each of the one or more further devices that are available to become a new child network coordinator (CPNC) master associated with the new radio device slave, become one or more available devices and transmit a corresponding availability signal in response to the initiation beacon in the form of one or several broadcast or unicast frames indicating that the one or more available devices are available to become new respective child network coordinator (CPNC) masters associated with the new radio device slave;*

*the temporary network coordinator (tempPNC), scanning the channels or frequencies, receiving the availability signals from the one or more available devices, comparing the availability signals and choosing at least one of the available devices that are available to become child network coordinator (CPNC) masters associated with the new radio device slave;*

*the temporary network coordinator (tempPNC) acknowledging the availability signals of the at least one chosen available devices;*

*upon acknowledgment, the new radio device ceasing to be a temporary network coordinator (tempPNC) and becoming a slave associated with the at least one chosen available device,*

*the at least one chosen available device becoming a child network coordinator (CPNC) master associated with the new radio device slave, the child network coordinator (CPNC) being a master device to the new device and a network coordinator to the network, and*

*the new radio device is thus connected to the existing network (piconet) as a slave device to the at least one chosen child network coordinator (CPNC).*

*14. The method as claimed in claim 13, wherein the initiation beacon comprises an information element indicating a temporary network/piconet identification (tempPNID).*

*15. The method as claimed in claim 13, wherein after broadcasting the initiation request, the temporary network coordinator (tempPNC) waits for a response for a predetermined period of time corresponding to a predetermined number of beacon frames.*

*16. The method as claimed in claim 13, wherein the acknowledgement of a selected child network coordinator (CPNC) is transmitted as part of a beacon signal.*

*17. A non-transitory computer readable medium comprising a computer program that when loaded on a network device implements a method of connecting a new radio device to an existing centralized radio network (piconet), the existing network comprising:*

*at least one master device having a transmission range (Tx) for its beacons and including a network coordinator (PNC); and*

*at least one further devices each within the transmission range (Tx) of the at least one network coordinator (PNC) to which it is associated, the further devices being slaves to the network coordinator (PNC) master and wherein:*

*the new radio device, determines if it needs to become a temporary network coordinator (tempPNC) in order to connect to the existing network (piconet) and if so, then it becomes a temporary network coordinator (tempPNC) and sends out a beacon containing an initiation request indicating that it requests to associate to an existing network (piconet) such as the existing centralized radio network (piconet);*

*the at least one further device belonging to the existing network (piconet) that receives the initiation beacon signal of the temporary network coordinator (tempPNC), and when asking is needed, asks its associated network coordinator (PNC) whether it is available to become a new child network coordinator (CPNC) device associated with the new radio device, when associated the new radio device becoming a slave of at least one child network coordinator (CPNC) master, and in case of receiving a positive answer from its associated network coordinator (PNC) or otherwise in the case where asking its associated network coordinator (PNC) is not needed, the at least one further device becoming an available device and transmitting a corresponding availability signal indicating that the at least one further device is available to become a new child piconet coordinator (CPNC) master to be associated with the new radio device as a slave device;*

*the temporary network coordinator (tempPNC) scans the channels or frequencies, receives the availability signals, compares them, and chooses at least one of the available at least one further devices to become the at least one child network coordinator (CPNC) master to be associated with the new radio device slave;*

*the temporary network coordinator (tempPNC) acknowledges the availability signals of the at least one chosen available devices;*

*the new radio device ceasing to be a temporary network coordinator (tempPNC) and becoming a slave device associated with the selected one or more available at least one further devices that have become child network coordinator(s) (CPNCs); and*

*the at least one chosen available devices becoming child network coordinator (CPNC) masters associated with the new radio device slave, the child network coordinator(s) (CPNCs) being both master devices and network coordinators; and*

*the new radio device is thus connected to the existing network (piconet) as a slave device to the at least one chosen child network coordinator (CPNC).*

*18. A method of connecting a new device to be added to an existing centralized radio network (piconet) the existing network comprising: at least one master device having a transmission range (Tx) and including a network coordinator (PNC); and at least one further device in the transmission range (Tx) of the network coordinator (PNC), the method comprising the steps of:*

*the new device to be added to the existing network becoming a temporary network coordinator (tempPNC) which broadcasts a beacon with an initiation request in the beacon indicating that it requests to associate to the existing network (piconet);*

*the at least one further device belonging to the existing network (piconet) that receives the beacon with the initiation request of the temporary network coordinator (tempPNC), when asking is needed, asks its own network coordinator (PNC) whether its available to become a new child network coordinator (CPNC) associated with the new network device, when associated the new network device becoming a slave of at least one child network coordinator (CPNC) master, and in case of receiving a positive answer or otherwise in case asking its own network coordinator (PNC) is not needed: transmitting a corresponding response signal in the form of one or several broadcast or unicast frames indicating that it is available to become a new child network coordinator (CPNC) to associate to;*

*the new device to be added to the network acting as a temporary network coordinator (tempPNC) scanning the channels or frequencies, receiving the response signals, comparing the response signals, and choosing at least one of the further devices that are available to become child network coordinators (CPNCs) as master;*

*the new device to be added to the network acknowledging the response signal of at least one of the selected further devices that are available to become child network coordinators'; and*

*the new device to be added to the network terminating its role of acting as a temporary network coordinator (tempPNC) and becoming a slave associated with the at least one chosen further device;*

*the at least one chosen further device becoming a child network coordinator (CPNC) master that works as a network coordinator; and*

*the new device is thus connected to the existing network (piconet).*

*19. A method of connecting a new device to be added to an existing centralized radio network (piconet) the existing network comprising:*

*at least one master device having a transmission range (Tx) for its beacons, and the at least one master device including a network coordinator (PNC); and at least one further device within the transmission range (Tx) of the network coordinator (PNC) with which it is associated, the method comprising the steps of:*

*the new device to be connected to the existing network (piconet) determining whether it needs to become a temporary network coordinator to connect with the existing network (piconet) and if so, then becoming a temporary network coordinator (tempPNC), broadcasting a beacon as temporary network coordinator including an initiation request in the beacon indicating that it requests to associate with the existing network (piconet);*

*the at least one further device belonging to the existing network (piconet) that receives the beacon with the initiation request of the temporary network coordinator (tempPNC), when asking is needed, the at least one further device asks its associated network coordinator (PNC) whether it is available to become a new child network coordinator (CPNC) associated with the new network device, when associated the new network device becoming a slave of at least one child network coordinator (CPNC) master, and in the case of receiving a positive answer from the temporary network coordinator (tempPNC) or otherwise in the case where asking its own network coordinator (PNC) is not needed, the at least one further device becoming an available device and in response to receiving the initiation request of the temporary network coordinator, transmitting a corresponding availability signal in the form of one or several broadcast or unicast frames indicating that it is available to become a new child network coordinator (CPNC) master to be associated with the new radio device slave;*

*the temporary network coordinator (tempPNC) scanning the channels or frequencies, receiving the availability signals, and selecting at least one of the available devices to become child network coordinator (CPNC) master to be associated with the new radio device as said slave device;*

*the temporary network coordinator (tempPNC) acknowledging the at least one of the availability signals of the selected available devices;*

*the at least one selected available device becoming a child network coordinator (CPNC) master that works as a network coordinator;*

*the new device to be added to the network terminating its role of acting as a temporary network coordinator (tempPNC) and becoming a slave device associated with the at least one selected available device; and*

*the new device is thus connected to the existing network (piconet) as a slave device to the at least one selected child network coordinator (CPNC).*

*20. A centralized radio network (piconet) for connecting to add a new device to an existing network, the existing network comprising of at least one master device having a transmission range (Tx) for its beacons and the at least one master device including a network coordinator (PNC); and at least one further device within the transmission range (Tx) of the network coordinator (PNC) with which it is associated, and wherein:*

*the new device for connecting to the existing network (piconet), determines if it needs to become a temporary network coordinator to connect to the existing network (piconet) and if so, the new device becomes a temporary network coordinator (tempPNC) and sends out an initiation beacon indicating that it intends to associate to the existing network (piconet);*

*the at least one further device belonging to the existing network (piconet) that receives the initiation beacon signal of the temporary network coordinator (tempPNC), when asking is needed, asks its own network coordinator (PNC) whether its available to become a new child network coordinator (CPNC) associated with the new device, when associated the new device becoming a slave of at least one child network coordinator (CPNC), and in case of receiving a positive answer or in case asking its own network coordinator (PNC) is not needed, the at least one further device becoming an available device, and transmitting a corresponding response signal indicating that it is available to become a new child network coordinator (CPNC) master to be associated with the new device as slave of the child network coordinator (CPNC);*

*the temporary network coordinator (tempPNC) receives the response signals, compares them and selects at least one of the available devices which will become the child network coordinator (CPNC) master it associates itself to;*

*the temporary network coordinator (tempPNC) acknowledges at least one of the availability signals and ceases*

*being a temporary network coordinator (tempPNC) and becomes a slave of the selected child network coordinator(s) (CPNCs) as master; and*

*the new device thus is connected to the existing network (piconet) as a slave device to the at least one selected child network coordinator (CPNC).*

*21. A new device to be connected to an existing centralized radio network (piconet), the existing network comprising at least one master device having a transmission range for its beacons, and the at least one master device including at least one network coordinator (PNC), and at least one further device in the transmission range (Tx) of the network coordinator (PNC), when the at least one further device receives a beacon containing an initiation request from the new device, the at least one further device determines whether it is available to become a new child network coordinator (CPNC) associated with the new device, when associated the new device becoming a slave of at least one child network coordinator (CPNC) master, and if the determination is positive then the at least one further device becomes an available device and transmits a response signal indicating that it is available to become a new child network coordinator (CPNC) master associated with the new device slave, the new device including at least a processor configured for:*

*enabling the new device to determine if it needs to become a temporary network coordinator (tempPNC) to connect to the existing network (piconet) and if so, the new device becomes a temporary network coordinator (tempPNC) and it broadcasts a beacon containing an initiation request, indicating that the new device to be connected intends to associate with the existing network (piconet);*

*enabling the new device to scan channels (frequencies) as temporary network coordinator (tempPNC) to receive response signals indicating that those available devices that sent the respective response signal are available to become child network coordinator (CNPC) master associated with the new device as slave of the child network coordinator (CPNC);*

*enabling the new device to compare the response signals received from the available devices and to choose at least one of the available devices to become a child network coordinator (CPNC) master associated with the new device as slave of the child network coordinator (CPNC) by acknowledging a corresponding response signal of the at least one of the available child network coordinator (CPNC); and*

*enabling the new device to cease being a temporary network coordinator (tempPNC) and instead becoming a slave device to the chosen at least one available device which has become a child network coordinator (CPNC) master;*

*the new radio device is thus connected to the existing network (piconet).*

*22. A method of connecting to add a new radio device to an existing centralized radio network (piconet), the existing network comprising: one or more master devices having transmission ranges (Tx) for their beacons and including a network coordinator (PNC), and one or more further devices each further device being within the transmission range (Tx) of the network coordinator (PNC) to which it is mutually associated, each further device being a slave of its associated network coordinator (PNC) master, the method comprising the steps of:*

*providing at least one new radio device for connection to the existing network to add the new radio device to any existing network;*

*the new radio device, determining if it needs to become a temporary network coordinator (tempPNC) to connect to any existing network and if so, then becoming a temporary network coordinator (tempPNC) which broadcasts a beacon containing an initiation request indicating that it requests to associate to any existing network (piconet);*

*in response to the initiation request, the one or more further devices that receive the initiation request of the temporary network coordinator (tempPNC) each determine whether they are available to become new child network coordinators (CPNC) associated with the new radio device, when associated the new radio device becoming a slave of at least one child network coordinator (CPNC) master, child network coordinators (CPNC) being master devices and network coordinators;*

*in case of a positive determination of availability, the one or more further devices that determined that they are available, become one or more available devices;*

*the temporary network coordinator (tempPNC) determining the available devices and choosing at least one of the available devices to become child network coordinator (CPNC) masters associated with the new radio device as a slave;*

*the temporary network coordinator (tempPNC) notifying the at least one chosen available devices;*

*the new radio device to be added to the network ceasing to be a temporary network coordinator (tempPNC) and instead becoming a slave associated with the chosen available devices;*

*the chosen available devices become child network coordinator (CPNC) masters associated with the new radio device slave; and*

*the new radio device is thus connected to the existing network (piconet).*

*23. The method of claim 22 wherein the new radio device determining whether it needs to become a temporary network coordinator (tempPNC) comprises:*

*the new radio device determines whether it is within the transmission range (Tx) of any of the one or more master devices, the determination including scanning channels or frequencies for a predetermined time corresponding to a predetermined number of beacon frames for detecting the beacon of any master device of the existing radio network;*

*when the beacon of at least one master device is detected which indicates that the new radio device is within the transmission range (Tx) of at least one master device of the existing network, then the new radio device chooses at least one of the master devices from which it received a beacon, and the new radio device sends a beacon reply to the at least one chosen master device, and then the new radio device associates itself as a slave of the chosen master devices, thus the new radio device is connected to the existing network (piconet) and the method terminates;*

*otherwise, when the beacon of any master device is not detected within the predetermined time indicating that new radio device is not within the transmission range (Tx) of any of the one or more master devices of the existing network, then the new radio device attempts to becomes a slave of a new child network coordinator (CPNC) of the existing network, and the method continues.*

*24. The method of claim 23 wherein prior to becoming a temporary network coordinator (tempPNC) the new radio*

*device ignores all beacons of master devices except the beacons of network coordinators (PNCs).*

*25. The method of claim 22 wherein the beacon with an initiation request that is broadcast by the temporary network coordinator (tempPNC) is a PNC request IE.*

*26. The method of claim 22, wherein the determination of whether a further device is available to become a new child network coordinator (CPNC) includes:*

*the further device determining whether it needs permission from its respective associated network coordinator (PNC) to become a child network coordinator (CPNC),*

*If permission is not needed, then the further device is available to become a new child network coordinator (CPNC),*

*otherwise if permission is needed, the further device sends a request to become a child network coordinator (CPNC) to its associated network coordinator (PNC), and only if a positive reply is received from the network coordinator (PNC) is the further device available to become a new child network coordinator (CPNC).*

*27. The method of claim 22 wherein the available devices become child network coordinators (CPNC) after it is determined that they are available to become new child network coordinator (CPNC) masters associated with the new radio device slave, and before they become associated with the new radio device slave.*

*28. The method of claim 22 wherein the available devices include child network coordinators (CPNC) that exist prior to the initiation beacon.*

*29. The method of claim 22 wherein:*

*when the further devices determine that they are available to become available devices in response to the initiation request of the temporary network coordinator (tempPNC), the available devices transmit corresponding availability signals in the form of one or several broadcast or unicast frames indicating that the available devices are available to become new respective child network coordinators (CPNC) masters associated with the new radio device slave; and*

*the temporary network coordinator (tempPNC) determines the available devices by scanning the channels or frequencies, and receiving the availability signals, and*

*the selection of one or more of the available devices depends on a comparison of the availability signals.*

*30. The method of claim 22, wherein:*

*after the one or more further devices determine that they are available and become the one or more available devices, then they transmit corresponding availability signals in response to the initiation request in the form of one or several broadcast or unicast frames to the temporary network coordinator (tempPNC) indicating that they are available to become child network coordinators (CPNC) masters associated with the new radio device slave;*

*after transmitting the initiation request, then the temporary network coordinator (tempPNC) scans the channels or frequencies, receives the availability signals, and processes the availability signals to determine the available devices; the temporary network coordinator (tempPNC) compares the availability signals to choose at least one of the respective available devices to become a child network coordinator (CPNC); and after choosing at least one of the available devices to become a child network coordinator (CPNC), then the temporary network coordinator (tempPNC) notifies the at least one chosen available device by acknowledging its respective availability signal.*

*31. A centralized radio network (piconet) which network comprises:*

*a new radio device;*

*an existing network, comprising:*

*one or more master devices having transmission ranges (Tx) for their beacons, including at least one network coordinator (PNCs); and*

*one or more further devices, each within the transmission range (Tx) of the network coordinator (PNC) with which it is mutually associated, each being a slave of its associated network coordinator (PNC) master: and*

*wherein:*

*the new radio device is configured to determine if it needs to become a temporary network coordinator (tempPNC) to connect to any existing network and if so, then it becomes a temporary network coordinator (tempPNC) and broadcasts a beacon containing an initiation request indicating that it requests to associate with any existing network (piconet);*

*one or more of the further devices belonging to the existing network (piconet) are configured to receive the initiation beacon of the temporary network coordinator (tempPNC), and determine whether they are available to become new child network coordinators (CPNC) associated with the new radio device, when associated the new radio device becoming a slave of at least one child network coordinator (CPNC) master, the child network coordinators (CPNC) being master devices and network coordinators;*

*in case of positive determination of availability, the one or more further devices that determine that they are available are configured to become one or more available devices;*

*the temporary network coordinator (tempPNC) is configured for determining the available devices, and choosing one or more of the available devices to become child network coordinator (CPNC) as masters associated with the new radio device as a slave;*

*the temporary network coordinator (tempPNC) is configured for notifying the chosen available devices;*

*the new radio device is configured to cease being a temporary network coordinator (tempPNC) and instead to become a slave associated with the one or more chosen available devices;*

*the one or more chosen available devices become child network coordinator (CPNC) masters associated with the new radio device slave; and*

*the new radio device is thus connected to the existing network (piconet).*

*32. The network of claim 31 wherein:*

*the new radio device determines whether it is within the transmission range (Tx) of any of the one or more master devices, the determination including scanning channels or frequencies for a predetermined time corresponding to a predetermined number of beacon frames for detecting the beacon of any master device of the existing radio network;*

*when the beacon of one or more master devices is detected which indicates that the new radio device is within the transmission range (Tx) of one or more of the one or more master devices of the existing network, then the new radio device chooses one or more of the master devices from which it received a beacon, and the new radio device sends a beacon reply to the one or more chosen master devices, and then the new radio device associates itself as a slave of the chosen master devices,*

*thus the new radio device is connected to the existing network (piconet) and the method terminates;*

*otherwise, when the beacon of any master device is not detected within the predetermined time indicating that new radio device is not within the transmission range (Tx) of any of the one or more master devices of the existing network, then the new radio device attempts to becomes a slave of a new child network coordinator (CPNC) of the existing network, and the method continues.*

*33. The network of claim 31 wherein the beacon with an initiation request that is broadcast by the temporary network coordinator (tempPNC) is a PNC request IE.*

*34. The network of claim 31, wherein the determination of whether a further device that has received a beacon containing an initiation request is available to become a child network coordinator (CPNC) includes:*

*the further device determining whether it needs permission from its respective associated network coordinator (PNC) to become a child network coordinator (CPNC),*

*If permission is not needed, then the further device is available to become a new child network coordinator (CPNC),*

*otherwise if permission is needed, the further device transmits a request to become a child network coordinator (CPNC) to its associated network coordinator (PNC), and only if a positive reply is received from the network coordinator (PNC) is the further device available to become a new child network coordinator (CPNC).*

*35. The method of claim 20 wherein the available devices become child network coordinators (CPNC) after they become available devices and before they become master devices associated with the new radio device slave.*

*36. The centralized radio network of claim 31 wherein:*

*when the further devices determine that they are available to become available devices in response to the initiation request of the temporary network coordinator (tempPNC), the available devices transmit corresponding availability signals in the form of one or several broadcast or unicast frames indicating that the available devices are available to become new respective child network coordinators (CPNC) masters associated with the new radio device slave; and*

*the temporary network coordinator (tempPNC) determines the available devices by scanning the channels or frequencies, and receiving the availability signals, and*

*the choosing of one or more of the available devices depends on a comparison of the availability signals.*

*37. The centralized radio network of claim 31, wherein:*

*after the one or more further devices determine that they are available and become the one or more available devices, then they are configured to transmit corresponding availability signals in response to the initiation request in the form of one or several broadcast or unicast frames to the temporary network coordinator (tempPNC) indicating that they are available to become child network coordinators (CPNC) masters associated with the new radio device slave;*

*after transmitting the initiation request, then the temporary network coordinator (tempPNC) is configured to scan the channels or frequencies and receive the availability signals and process the availability signals to determine the available devices; and the temporary network coordinator (tempPNC) is configured to compare the availability signals of the available devices to choose at least one of the available devices to become a child network coordinator (CPNC);*

*after choosing at least one of the available devices to become a child network coordinator (CPNC), then the temporary network coordinator (tempPNC) notifies the at least one chosen available device by acknowledging its respective availability signal.*

*38. A new radio device for connection to an existing centralized radio network (piconet), the existing network comprising: one or more master devices each having a transmission range (Tx) for its beacons and including a network coordinator (PNCs), and one or more further devices, each within the transmission range (Tx) of an network coordinator (PNC) with which it is mutually associated, each further device being a slave of its associated network coordinator (PNC) master, and when the further device receives an initiation request in a beacon of a temporary network coordinator (tempPNC) it determines whether it is available to become a child network coordinator (CPNC) associated with the new radio device, when associated the new radio device becoming a slave of the child network coordinator (CPNC) master, and if the further device is available to become a new respective child network coordinator (CPNC) master associated with the new radio device slave to become a new respective child network coordinator (CPNC) master associated with the new radio device slave then then it becomes an available device, the new radio device comprising:*

*a processor, and*

*wherein:*

*the new radio device is configured to determine whether to become a temporary network coordinator (tempPNC) and if so, the new radio device becomes a temporary network coordinator (tempPNC) and it broadcasts a beacon containing an initiation request indicating that the new radio device requests to associate with the existing network (piconet);*

*the new radio device as a temporary network coordinator (tempPNC) is configured to determine the available devices and to choose at least one of the available devices and to notify the chosen available devices; and*

*the new radio device is configured to cease being a temporary network coordinator (tempPNC) and instead become a slave associated with the at least one chosen available device that has become a child network coordinator (CPNC)*

*the new radio device is thus connected to the existing network (piconet).*

*39. The new radio device of claim 38 wherein:*

*prior to the new radio device becoming a temporary network coordinator (tempPNC) the new radio device is configured to attempt to become a slave of any of the one or more existing master device of the existing network:*

*the new radio device is configured to determine whether it is within the transmission range (Tx) of any of the one or more master devices, the determination including scanning channels or frequencies for a predetermined time corresponding to a predetermined number of beacon frames for detecting the beacon of any master device of the existing radio network;*

*when the beacon of one or more master devices is detected which indicates that the new radio device is within the transmission range (Tx) of one or more of the one or more master devices, then the new radio device is configured to choose one or more of the master devices from which it received a beacon, and the new radio device is configured to send a beacon reply to the chosen master devices, and the new radio device is configured to asso-*

*ciate itself as a slave of the chosen master devices, thus the new radio device is connected to the existing network (piconet);*

*otherwise, when the beacon of a master device is not detected within the predetermined time then the new radio device is configured to attempt to becomes a slave of a new child network coordinator (CPNC) of the existing network and the method continues.*

*40. The new radio device of claim 38 wherein the beacon with an initiation request that is broadcast by the temporary network coordinator (tempPNC) is a PNC request IE.*

*41. The new radio device of claim 38 wherein:*

*when the further devices determine that they are available to become available devices in response to the initiation request of the temporary network coordinator (tempPNC), the available devices transmit corresponding availability signals in the form of one or several broadcast or unicast frames indicating that the available devices are available to become new respective child network coordinators (CPNC) masters associated with the new radio device slave; and*

*the temporary network coordinator (tempPNC) determines the available devices by scanning the channels or frequencies, and receiving the availability signals, and*

*the choosing of one or more of the available devices depends on a comparison of the availability signals.*

*42. The new radio device of claim 38, wherein:*

*after each further device determine that it is available and become an available device, then they transmit a corresponding availability signal in response to the initiation beacon in the form of one or several broadcast or unicast frames to the temporary network coordinator (tempPNC) indicating that the available device is available to become a child network coordinator (CPNC) master associated with the new radio device slave;*

*after transmitting the initiation request, then the new radio device as a temporary network coordinator (tempPNC) is configured to scan the channels or frequencies, receive the availability signals and process the availability signals received from the available devices in response to the initiation beacon; and the temporary network coordinator (tempPNC) is configured to process the availability signals to determine the available devices; and temporary network coordinator (tempPNC) is configured the compare the availability signals to choose at least one of the respective available devices to become a child network coordinator (CPNC); and the temporary network coordinator notifies the at least one available device that was chosen by acknowledging the respective availability signal of the at least one available device.*

*43. A non-transitory media comprising a computer program that when communicating with a new radio device implements a method for connecting to add the new radio device to an existing centralized radio network (piconet) which existing network comprises: one or more master devices having transmission ranges (Tx) for their beacons and including a network coordinator (PNC); and one or more further devices, each within the transmission range (Tx) of the network coordinator (PNC) with which it is associated, each further device being a slave of its associated network coordinator (PNC) master, and when a further device receives an initiation request in a beacon of a temporary network coordinator (tempPNC) it determines if its available to become a new child network coordinator (CPNC) associated with the new radio device, when associated the new radio device becoming a slave of at least one child network coordinator (CPNC) master, and if the further device is available it becomes an available device, the method comprising the acts of:*

*the new radio device determines whether to become a temporary network coordinator (tempPNC) and if so, it becomes a temporary network coordinator (tempPNC) which broadcasts a beacon containing an initiation request indicating that the new radio device requests to associate with the existing network (piconet);*

*the temporary network coordinator (tempPNC) determining the available devices and choosing one or more of the available devices to become new child network coordinators (CPNCs);*

*the temporary network coordinator (tempPNC) notifying the available devices that were chosen to become child network coordinators (CPNCs); and*

*the new radio device ceasing to be a temporary network coordinator (tempPNC) and instead becoming a slave associated with the one or more chosen available devices that have become respective child network coordinators (CPNC) masters; and*

*the new radio device is thus connected to the existing network (piconet).*

*44. The media of claim 43 wherein the new radio devices determination of whether to become a temporary network coordinator (tempPNC) comprises the acts of:*

*the new radio device determines whether it is within the transmission range (Tx) of any of the one or more master devices, the determination including scanning channels or frequencies for a predetermined time corresponding to a predetermined number of beacon frames for detecting the beacon of any master device of the existing radio network,*

*when the beacon of at least one master device is detected which indicates that the new radio device is within the transmission range (Tx) of one or more of the one or more master devices, then the new radio device chooses one or more of the master devices from which it received a beacon, and then the new radio device sends a reply to the chosen master devices and associates itself as a slave of the chosen master devices, thus the new radio device is connected to the existing network (piconet);*

*otherwise, when the beacon of a master device is not detected within the predetermined time then the new radio device attempts to becomes a slave of a new child network coordinator (CPNC) of the existing network and the method continues.*

*45. The media of claim 43 wherein the beacon with an initiation request that is broadcast by the temporary network coordinator (tempPNC) is a PNC request IE.*

*46. The non-transitory media of claim 43 wherein:*

*when the further devices determine that they are available to become available devices in response to the initiation request of the temporary network coordinator (tempPNC), the available devices transmit corresponding availability signals in the form of one or several broadcast or unicast frames indicating that the available devices are available to become new respective child network coordinators (CPNC) masters associated with the new radio device slave; and*

*the temporary network coordinator (tempPNC) detects the available devices by scanning the channels or frequencies, and receiving the availability signals, and*

*the choosing of one or more of the available devices depends on a comparison of the availability signals.*

*47. The media of claim 43, wherein:*

*after a further device determines that it is available to become an available device, then it transmits a corresponding availability signal in response to the initiation beacon in the form of one or several broadcast or unicast frames to the temporary network coordinator (temp-PNC) indicating that it is available to become a child network coordinator (CPNC) master associated with the new radio device slave;*

*after transmitting the initiation request, then the temporary network coordinator (tempPNC) scans the channels or frequencies, receives the availability signals and processes the availability signals to determine the available devices depending on the received availability signals; and the temporary network coordinator (tempPNC) compares the availability signals in order to choose at least one of the respective available devices to become a child network coordinator (CPNC);*

*after choosing at least one of the available devices to become a child network coordinator (CPNC), then the temporary network coordinator (tempPNC) notifies the at least one chosen available device by acknowledging its respective availability signal.*

* * * * *